(12) United States Patent
Uchimoto et al.

(10) Patent No.: US 10,199,866 B2
(45) Date of Patent: Feb. 5, 2019

(54) CONTROL CIRCUIT FOR WIRELESS POWER RECEIVER AND CONTROL METHOD

(71) Applicant: ROHM CO., LTD., Ukyo-Ku, Kyoto (JP)

(72) Inventors: Daisuke Uchimoto, Kyoto (JP); Tatsuya Iwasaki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 412 days.

(21) Appl. No.: 15/067,594

(22) Filed: Mar. 11, 2016

(65) Prior Publication Data

US 2016/0197513 A1 Jul. 7, 2016

Related U.S. Application Data

(63) Continuation of application No. PCT/JP2014/070352, filed on Aug. 1, 2014.

(30) Foreign Application Priority Data

Sep. 11, 2013 (JP) .................. 2013-188721

(51) Int. Cl.
*H02J 50/10* (2016.01)
*H02J 7/02* (2016.01)
*H02J 7/04* (2006.01)
*H04B 5/00* (2006.01)
*H02J 50/12* (2016.01)
*H02J 50/80* (2016.01)

(52) U.S. Cl.
CPC .............. *H02J 50/10* (2016.02); *H02J 7/025* (2013.01); *H02J 7/04* (2013.01); *H02J 7/045* (2013.01); *H02J 50/12* (2016.02); *H02J 50/80* (2016.02); *H04B 5/0037* (2013.01); *H04B 5/0093* (2013.01)

(58) Field of Classification Search
CPC .. H02J 50/10; H02J 50/80; H02J 50/12; H02J 7/025; H02J 7/04; H02J 7/045; H04B 5/0037; H04B 5/0093
See application file for complete search history.

(56) References Cited

U.S. PATENT DOCUMENTS

2013/0033235 A1 2/2013 Fukaya
2015/0249339 A1* 9/2015 Van Wageningen .... H02J 5/005
307/104

FOREIGN PATENT DOCUMENTS

JP 2013038854 A 2/2013

* cited by examiner

*Primary Examiner* — Daniel Cavallari
(74) *Attorney, Agent, or Firm* — Cantor Colburn LLP (57) ABSTRACT

A rectifier circuit is coupled to a reception coil, and generates a rectified voltage. A charger circuit receives the rectified voltage, and charges a secondary battery. A modulator coupled to the reception coil modulates a voltage or a current applied to the reception coil based on a control value, and transmits a control packet including the control value to a wireless power transmitter. A charging control unit controls a charging current supplied from the charger circuit to the secondary battery. A power control unit generates a control error value indicating a power transmission rate for the wireless power transmitter, based on the difference between the present rectified voltage and its target value, and outputs the control error value as the control value to the modulator. When the absolute value of the difference is smaller than a predetermined threshold value, the charging control unit changes the charging current.

14 Claims, 4 Drawing Sheets

CONTROL CIRCUIT FOR WIRELESS POWER RECEIVER AND CONTROL METHOD

CROSS-REFERENCE TO RELATED APPLICATIONS

This application is a continuation under 35 U.S.C. § 120 of PCT/JP2014/070352, filed Aug. 1, 2014, which is incorporated herein reference and which claimed priority to Japanese Application No. 2013-188721, filed Sep. 11, 2013. The present application likewise claims priority under 35 U.S.C. § 119 to Japanese Application No. 2013-0188721, filed Sep. 11, 2013, the entire content of which is also incorporated herein by reference.

BACKGROUND OF THE INVENTION

1. Field of the Invention

The present invention relates to a wireless power supply technique.

2. Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

Figure 1:
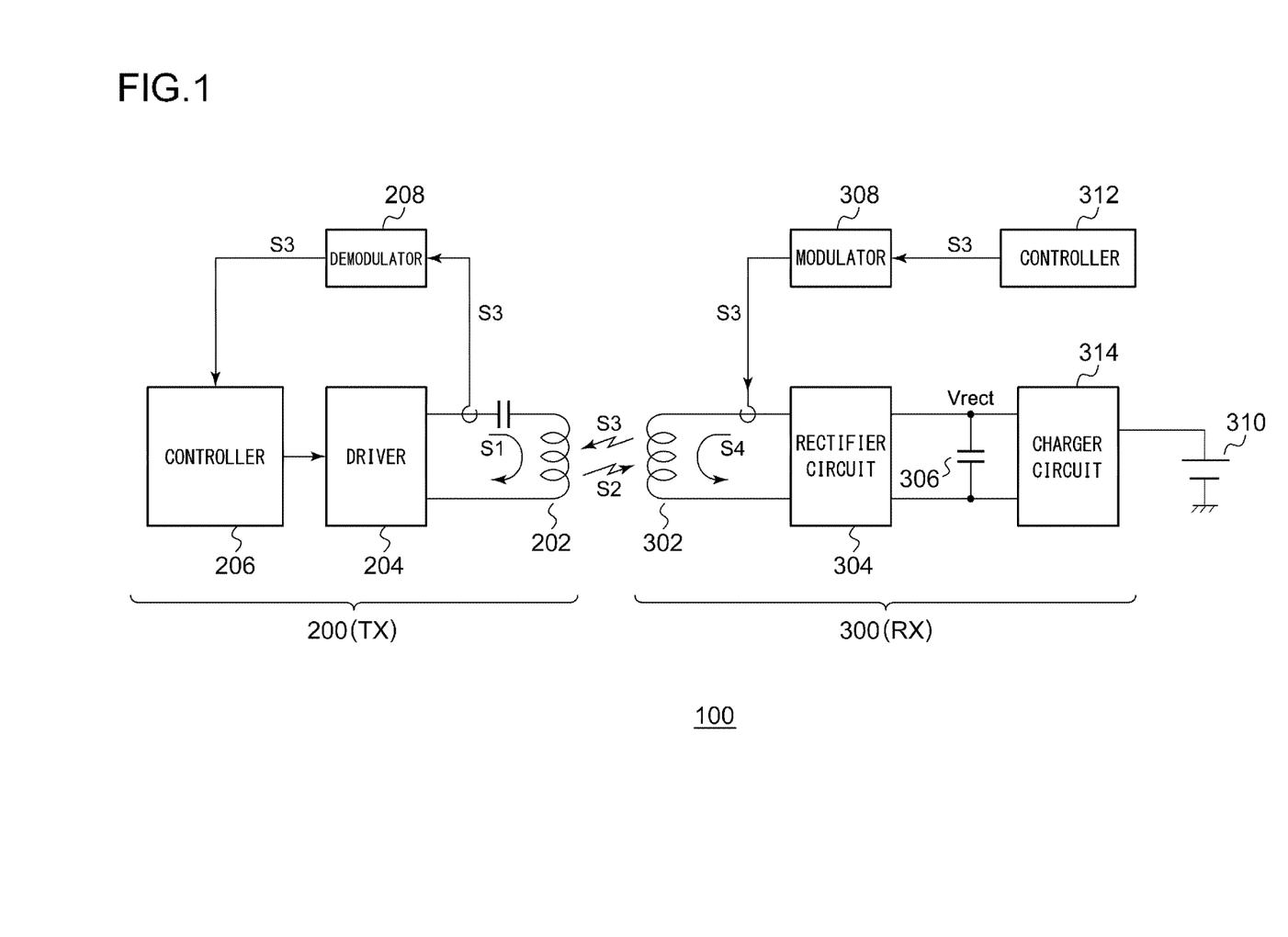
FIG. 1 is a diagram showing a configuration of a wireless power supply system that conforms to the Qi standard.

FIG. 1 is a diagram showing a configuration of a wireless power supply system 100 that conforms to the Qi standard. The power supply system 100 includes a power transmitter 200 (TX) and a power receiver 300 (RX). The power receiver 300 is mounted on an electronic device, examples of which include cellular phone terminals, smartphones, audio players, game machines, and tablet terminals.

The power transmitter 200 includes a transmission coil (primary coil) 202, a driver 204, a controller 206, and a demodulator 208. The driver 204 includes an H-bridge circuit (full-bridge) circuit or otherwise a half-bridge circuit. The driver 204 applies a driving signal S1, specifically, a pulse signal to the transmission coil 202, such that a driving current flows through the transmission coil 202, thereby allowing the transmission coil 202 to generate an electric power signal S2 in the form of an electromagnetic field signal. The controller 206 integrally controls the overall operation of the power transmitter 200. Specifically, the controller 206 controls the switching frequency of the driver 204 or otherwise the duty ratio of the switching of the driver 204 so as to adjust the electric power to be transmitted.

In the Qi standard, a protocol is defined for communication between the power transmitter 200 and the power receiver 300, which enables information transmission from the power receiver 300 to the power transmitter 200 via a control signal S3. The control signal S3 is transmitted from a reception coil 302 (secondary coil) to the transmission coil 202 in the form of an AM (Amplitude Modulation) modulated signal using backscatter modulation. The control signal S3 includes electric power control data (which will also be referred to as a "packet") which indicates an amount of electric power to be supplied to the power receiver 300, and data which indicates the particular information for identifying the power receiver 300. The demodulator 208 demodulates the control signal S3 included in the current or otherwise the voltage applied to the transmission coil 202. The controller 206 controls the driver 204 based on the power control data included in the control signal S3 thus demodulated.

The power receiver 300 includes the reception coil 302, a rectifier circuit 304, a capacitor 306, a modulator 308, a secondary battery 310, a controller 312, and a charger circuit 314. The reception coil 302 receives the electric power signal S2 from the transmission coil 202, and transmits the control signal S3 to the transmission coil 202. The rectifier circuit 304 and the capacitor 306 rectify and smooth a current S4 induced at the reception coil 302 according to the electric power signal S2, thereby converting the current S4 into a DC voltage.

The charger circuit 314 charges the secondary battery 310 using electric power supplied from the power transmitter 200.

The controller 312 monitors the amount of electric power supplied to the power receiver 300, and accordingly generates electric power control data (control error value) which indicates the amount of power transmission. The modulator 308 modulates the control signal S3 including the electric power control data so as to modulate the coil current that flows through the reception coil 302, thereby modulating the coil current and coil voltage applied to the transmission coil 202.

Figure 2:
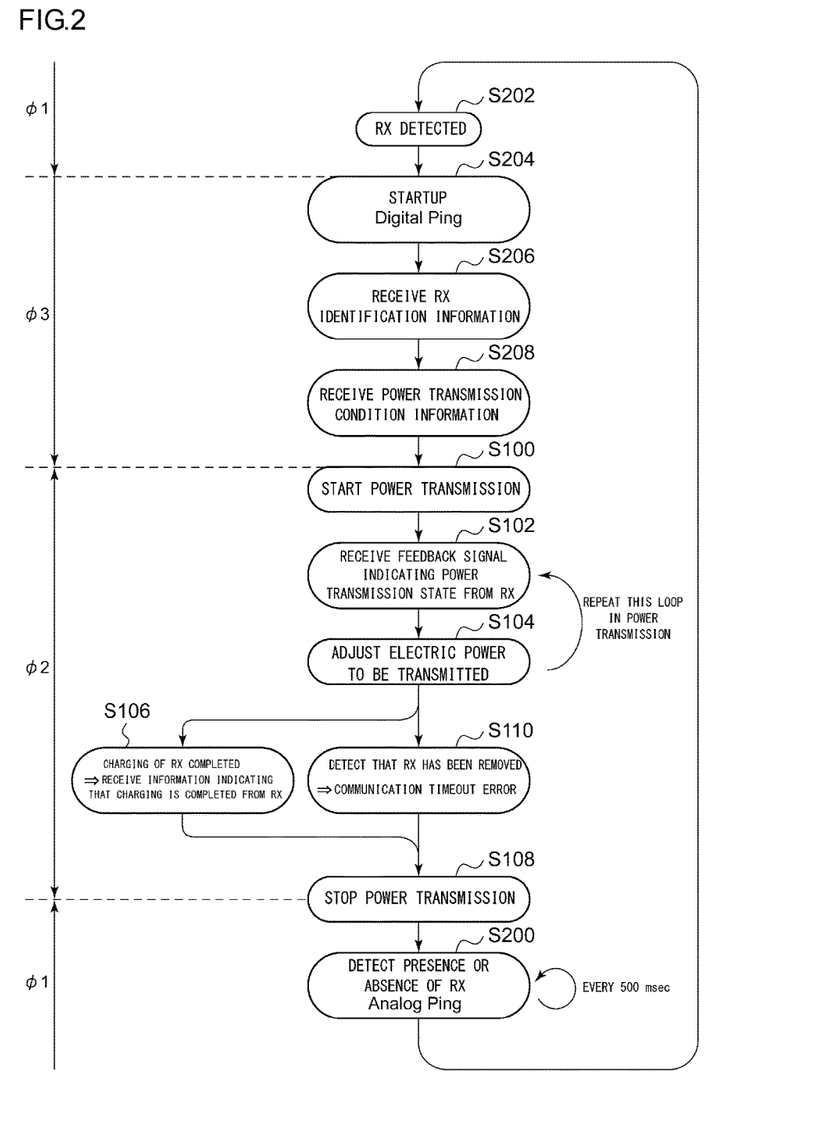
FIG. 2 is a flowchart showing an operation sequence for the power supply system shown in FIG. 1.

The above is the configuration of the wireless power supply system 100. FIG. 2 is a flowchart showing an operation sequence of the power supply system 100. The state of the power transmitter 200 can be roughly classified into three phases, i.e., a selection phase φ1, a power transfer phase φ2, and an identification/configuration phase φ3.

First, description will be made regarding the power transfer phase φ2. The power transmitter 200 (TX) starts power transmission to the power receiver 300 (RX) (S100). The power transmitter TX receives, as a feedback signal from the power receiver RX, the control signal S3 which indicates the present power transmission state (S102). The power transmitter TX adjusts the power transmission rate based on the control signal S3 (S104).

When the power receiver RX transmits the control signal S3 indicating that the charging has been completed (S106) or otherwise when the power transmitter TX detects, according to a communication timeout error control operation, that the power receiver RX has been removed from an area where it can receive the power supply provided by the power transmitter TX (S108), the power transmitter TX stops power transmission. In this stage, the power transmitter TX transits to the selection phase φ1.

Next, description will be made regarding the selection phase φ1. The power transmitter TX transmits an electric power signal S2 at a predetermined time interval (object detection interval, e.g., 500 msec), so as to detect the presence or absence of the power receiver RX (S200). Such an operation will be referred to as the "analog ping phase" hereafter.

Upon detection of the power receiver RX (S202), the power transmitter TX transits to the identification/configuration phase φ3. In this stage, a digital ping phase is executed (S202). In the subsequent identification/configuration phase, the power transmitter TX receives identification information with respect to the power receiver RX (S206). Subsequently, the power transmitter TX receives information with respect to the power transmission conditions from the power receiver RX (S208), following which the power transmitter TX transits to the power transfer phase φ2. The above is the operation sequence of the power transmitter 200.

As a result of investigating such a power supply system 100, the present inventors have come to recognize the following problem.

The charger circuit 314 is switchable between a constant current (CC) charging mode and a constant voltage (CV) charging mode according to the state of the secondary battery 310. In the CC charging mode, the charger circuit 314 adjusts the value of the charging current supplied to the secondary battery 310.

Figure 3:
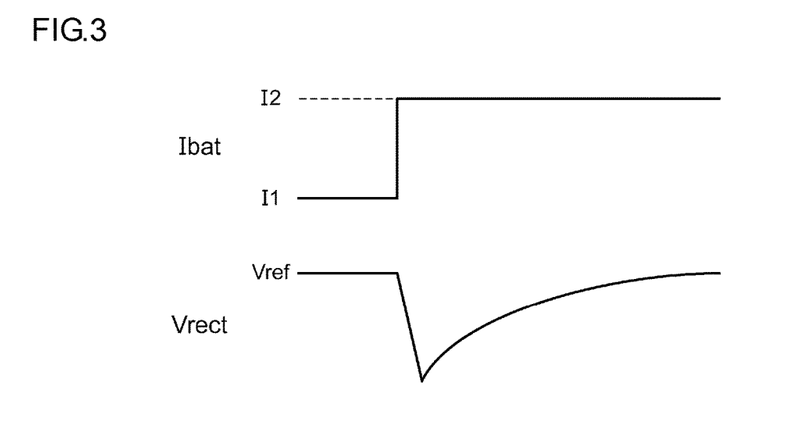
FIG. 3 is an operation waveform diagram showing the operation of a power receiver shown in FIG. 1.

FIG. 3 is an operation waveform diagram showing the operation of the power receiver 300 shown in FIG. 1. In a steady state, such an arrangement provides a balance between the current supplied from the rectifier circuit 304 to the capacitor 306 and the current supplied from the capacitor 306 to the charger circuit 314, i.e., the charging current Ibat. In this state, the rectified voltage Vrect that develops across the capacitor 306 is stabilized to a target level.

With such an arrangement, the current supplied from the rectifier circuit 304 to the capacitor 306 corresponds to the electric power supplied from the power transmitter 200 to the power receiver 300. That is to say, the current supplied from the rectifier circuit 304 to the capacitor 306 is controlled according to the control signal S3. If the charger circuit 314 increases the charging current Ibat, a large current is drawn from the capacitor 306. This reduces the rectified voltage Vrect, leading to an increased control error value included in the control signal S3. In this state, the power transmitter 200 is subjected to a feedback control operation so as to raise the power supply to the power receiver 300. The speed of such a feedback control operation is limited by the communication rate of the control signal S3 and the time required for the power transmitter 200 to stabilize to a new operation point. Thus, if the charging current Ibat suddenly changes, in some cases, the feedback control operation does not follow such a sudden change. In some cases, this leads to marked deviation of the rectified voltage Vrect from its target value. If there is a large change in the rectified voltage Vrect, or if the rectified voltage has a sharp change in its waveform, this leads to adverse effects on the AM modulation of the control signal S3 employing backscatter modulation, resulting in a problem in that the power transmitter 200 cannot receive the control error value in a normal manner. That is to say, in some cases, such a sudden change in the charging current Ibat leads to cutoff of the feedback loop. If the disconnection of communication between the power transmitter 200 and the power receiver 300 continues for a predetermined timeout period, the power transmitter TX stops power transmission, and returns to the selection phase φ1.

It should be noted that such a problem is by no means within the scope of common and general knowledge of those skilled in this art.

SUMMARY OF THE INVENTION

The present invention has been made in order to solve such a problem. Accordingly, it is an exemplary purpose of an embodiment of the present invention to provide a power receiver which is capable of stabilizing communication between the power receiver and a power transmitter.

An embodiment of the present invention relates to a control circuit employed in a wireless power receiver. The wireless power receiver comprises: a reception coil; a rectifier circuit that is coupled to the reception coil and that generates a rectified voltage; a charger circuit that receives the rectified voltage, and that charges a battery; and a modulator that is coupled to the reception coil, and that modulates a voltage or otherwise a current applied to the reception coil according to a control value so as to transmit a control packet including the control value to a wireless power transmitter. The control circuit comprises: a charging control unit that controls a charging current supplied from the charger circuit to the battery; and a power control unit that generates a control error value which indicates an electric power to be transmitted from the wireless power transmitter based on the difference between the present rectified voltage and a target value thereof, and that outputs the control error value thus generated as the control value to the modulator. When the absolute value of the difference is smaller than a predetermined threshold value, the charging control unit changes the charging current.

With such an embodiment, when the absolute value of the difference is larger than the threshold value, the setting value of the charging current is maintained. Thus, such an arrangement is capable of preventing the rectified voltage from markedly deviating from the target value and of preventing the rectified voltage from having a sharp change in its waveform. This provides stabilized communication between the power transmitter and the power receiver.

Also, when the charging current is to be changed from an initial value to a final value, the charging control unit may change the charging current in a stepwise manner from the initial value to the final value via multiple intermediate values set between the initial value and the final value. In this case, the charging control unit may maintain the charging current until the absolute value of the difference becomes smaller than the threshold value every time the charging current is changed by one step, following which the charging control unit changes the charging current to a value that corresponds to a next step.

The charging control unit may change the charging current in units of a predetermined minimum step.

Also, the control circuit may conform to the Qi standard.

Also, the control circuit may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit as a single IC, such an arrangement allows the circuit area to be reduced, and allows the circuit elements to have uniform characteristics.

Another embodiment of the present invention relates to a wireless power receiver. The wireless power receiver comprises: a reception coil; a rectifier circuit that is coupled to the reception coil, and that generates a rectified voltage; a charger circuit that receives the rectified voltage, and that charges a battery; a modulator that is coupled to the reception coil, that modulates a voltage or otherwise a current applied to the reception coil according to a control value, and that transmits a control packet including the control value to a wireless power transmitter; and any one of the aforementioned control circuits.

Yet another embodiment of the present invention also relates to a wireless power receiver. The wireless power receiver comprises: a reception coil; a rectifier circuit that is coupled to the reception coil, and that generates a rectified voltage; a charger circuit that receives the rectified voltage, and that charges a battery; a modulator that is coupled to the reception coil, that modulates a voltage or otherwise a current applied to the reception coil according to a control value, and that transmits a control packet including the control value to a wireless power transmitter; a charging control unit that controls a charging current supplied from the charger circuit to the battery; and a power control unit that generates a control error value which indicates a rate of electric power transmission to be supplied from the wireless power transmitter, based on a difference between the present rectified voltage and a target value thereof, and that outputs the control error value thus generated as the control value to the modulator. The charging control unit changes the charging current such that an absolute value of the difference does not exceed a predetermined allowable value.

With such an embodiment, by changing the charging current while monitoring the difference that occurs in the rectified voltage, such an arrangement is capable of preventing the rectified voltage from markedly deviating from the target value and of preventing the rectified voltage from having a sharp change in its waveform. This provides stabilized communication between the power transmitter and the power receiver.

Also, when the charging current is to be changed from an initial value to a final value, the charging control unit may repeatedly perform: changing the charging current by a predetermined step; and maintaining the charging current until the absolute value of the difference becomes smaller than the predetermined threshold value.

The charging control unit may change the charging current in units of a predetermined minimum step.

Also, the wireless power receiver may conform to the Qi standard.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected/coupled to the member B" includes a state in which the member A is indirectly connected/coupled to the member B via another member that does not substantially affect the electric connection therebetween, or that does not prevent the functions or effects of the connection therebetween, in addition to a state in which the member A is physically and directly connected/coupled to the member B.

Similarly, the state represented by the phrase "the member C is provided between the member A and the member B" includes a state in which the member A is indirectly connected/coupled to the member C, or the member B is indirectly connected/coupled to the member C via another member that does not substantially affect the electric connection therebetween, or that does not damage the functions or effects of the connection therebetween, in addition to a state in which the member A is directly connected/coupled to the member C, or the member B is directly connected/coupled to the member C.

Figure 4:
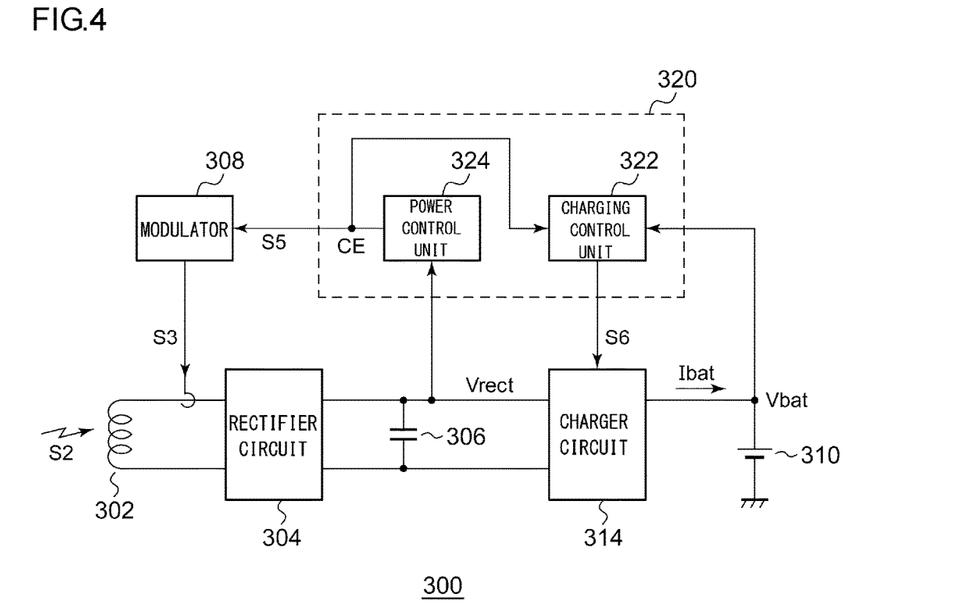
FIG. 4 is a circuit diagram showing a configuration of a wireless power receiver according to an embodiment.

FIG. 4 is a circuit diagram showing a wireless power receiver (which will simply be referred to as the "power receiver" hereafter) 300 according to an embodiment. The power receiver 300 is employed in a power supply system 100 that conforms to the Qi standard as shown in FIG. 1.

The power receiver 300 includes a reception coil 302, a rectifier circuit 304, a capacitor 306, a modulator 308, a charger circuit 314, a secondary battery 310, and a control circuit 320.

The reception coil 302 is provided in order to receive an electric power signal S2 transmitted from a power transmitter 200, and to transmit a control signal (control packet) S3. The rectifier circuit 304 is connected to the reception coil 302, and generates a rectified voltage Vrect. The output of the rectifier circuit 304 is connected to the smoothing capacitor 306.

The charger circuit 314 receives the rectified voltage Vrect, and charges the secondary battery 310. The charger circuit 314 is capable of operating in a mode according to an instruction received from the control circuit 320 as described later. Furthermore, the charging current Ibat can be adjusted according to an instruction value received from the control circuit 320.

The modulator 308 is connected to the reception coil 302. The modulator 308 modulates a voltage or otherwise a current applied to the reception coil 302 according to a control value S5, and transmits, to a wireless power transmitter (not shown), the control signal S3 including the control value S5.

The control circuit 320 includes a charging control unit 322 and a power control unit 324, which are monolithically integrated on a single semiconductor substrate. The control circuit 320 controls the charger circuit 314, and adjusts the charging current Ibat supplied to the secondary battery 310. Specifically, the control circuit 320 determines an optimum charging current Ibat based on the state of the secondary battery 310, e.g., the battery voltage Vbat, the remaining battery charge of the secondary battery 310, or the like, and outputs, to the charger circuit 314, current control data S6 which indicates the charging current Ibat.

The power control unit 324 generates a control error value CE that indicates the power transmission rate to be provided by the wireless power transmitter, based on the difference between the present rectified voltage Vrect and its target value Vref, i.e., based on the difference dV=Vref−Vrect. The power control unit 324 outputs the control error value CE to the modulator 308 in the form of the control value S5. The control error value CE may be configured in the form of 256 gradations ranging between −128 and 128 (an 8-bit signal), obtained by quantizing the difference dV, for example.

When the absolute value |dV| of the difference dV is smaller than a predetermined threshold value Vth, the charging control unit 322 changes the charging current Ibat. When the absolute value |dV| of the difference dV is larger than the threshold value Vth, the charging control unit 322 maintains the charging current Ibat.

More preferably, when the charging current Ibat is to be changed from an initial value (present value) Istart up to a final value Iend, the charging control unit 322 sets a multiple of n intermediate values Im1, Im2, . . . , Imn between the initial value Istart and the final value Iend. The charging control unit 322 changes the charging current Ibat in a stepwise manner from the initial value Istart up to the final value Iend via the multiple intermediate values Im1, Im2, . . . , Imn thus set between the initial value Istart and the final value Iend. The charging control unit 322 holds the current value until the absolute value |dV| of the difference dV becomes smaller than the threshold value Vth every time the charging control unit 322 changes the charging current Ibat by one step. Subsequently, the charging control unit 322 changes the charging current Ibat to a value that corresponds to the next step.

The intervals at which the multiple intermediate values Im1 through Imn are set may be equal to the minimum step (resolution) of the charging current Ibat adjustment that can be set for the charger circuit 314. For example, in a case in which the charging current Ibat can be selected in increments of Id=100 mA between the minimum value 0 A and the maximum value 2 A, intermediate values Im may be set at intervals of 100 mA.

From another viewpoint, the charging control unit 322 changes the charging current Ibat according to a pattern determined such that the absolute value |dV| of the difference dV does not exceed a predetermined allowable value.

Figure 5:
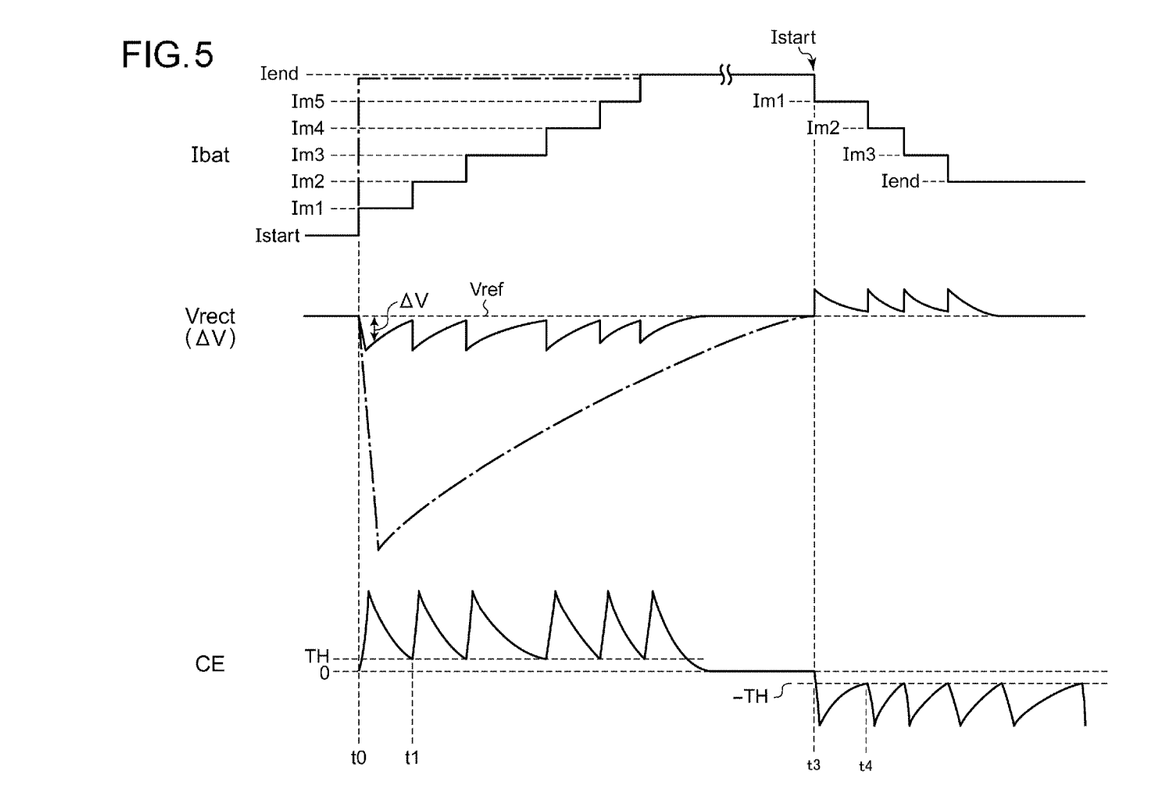
FIG. 5 is a waveform diagram showing the operation of the power receiver shown in FIG. 4.

The above is the configuration of the power receiver 300. Next, description will be made regarding the operation thereof. FIG. 5 is a waveform diagram (solid line) showing the operation of the power receiver 300. In FIG. 5, the waveform that corresponds to the operation shown in FIG. 3 is represented by the line of alternately long and short dashes.

In order to clarify the effects of the power receiver 300 according to the embodiment, description will be made again regarding the operation of the power receiver 300 according to conventional techniques with reference to the line of alternately long and short dashes. At the time point t0, the target value of the charging current Ibat changes from the present value (initial value) Istart to the next target value (final value) Iend. With such a conventional technique, as represented by the line of alternately long and short dashes, the charging current Ibat is switched from the initial value Istart to the final value Iend at the time point t0. This involves a sharp, large drop of the rectified voltage Vrect from its target value Vref. This leads to a problem of an undesired disconnection between the power transmitter 200 and the power receiver 300.

In contrast, description will be made with reference to the solid line regarding the operation of the power receiver 300 according to the embodiment. When the charging current Ibat is to be changed from the initial value Istart to the final value Iend, the multiple intermediate values Im1, Im2, Im3, . . . , are determined. For example, when the charging current Ibat is changed from Istart=500 mA to Iend=1100 mA, the charging current Ibat is switched in a stepwise manner in six steps in increments of 100 mA.

First, the charging current Ibat is set to the first intermediate value Im1 (=600 mA). This involves a slight reduction in the rectified voltage Vrect. Such a reduction in the rectified voltage Vrect leads to an increased difference dV, which increases the control error value CE. This instructs the power transmitter 200 to raise the electric power to be transmitted. Such an operation is repeatedly performed, which raises the rectified voltage Vrect such that it approaches the target value Vref. This reduces the control error value CE which represents the difference dV between the rectified voltage Vrect and its target value Vref.

Subsequently, when the control error value CE becomes smaller than the threshold value TH that corresponds to the threshold voltage Vth at the time point t1, i.e., when the absolute value |dV| of the difference dV becomes smaller than the threshold voltage Vth, the charging current Ibat is switched to the next intermediate value Im2 (=700 mA). The control circuit 320 repeatedly performs such an operation so as to change the charging current Ibat to the final value Iend.

With the power receiver 300, when the absolute value |dV| of the difference dV is larger than the threshold value Vth, the setting value of the charging current Ibat is maintained and held until the absolute value |dV| of the difference dV becomes smaller than the threshold Vth. Thus, such an arrangement is capable of preventing the rectified voltage Vrect from markedly deviating from the target value Vref and of preventing the rectified voltage Vrect from having a sharp change in its waveform. This is capable of stabilizing communication between the power transmitter 200 and the power receiver 300.

After the time point t3, the waveform shows the operation for reducing the charging current Ibat. For example, the charging current Ibat is switched in a stepwise manner in four steps in increments of 100 mA from Istart=1100 mA up to Iend=700 mA.

First, the charging current Ibat is set to the first intermediate value Im1 (=1000 mA). This involves a slight increase in the rectified voltage Vrect. Such an increase in the rectified voltage Vrect leads to a reduction in the control error value CE (an increase in the absolute value thereof). This instructs the power transmitter 200 to reduce the electric power to be transmitted. Such an operation is repeatedly performed, which reduces the rectified voltage Vrect such that it approaches the target value Vref. This reduces the absolute value of the control error value CE which represents the difference dV between the rectified voltage Vrect and its target value Vref.

Subsequently, when the control error value CE rises up to the threshold value −TH at the time point t4, i.e., when the absolute value |dV| of the difference dV becomes smaller than the threshold voltage Vth, the charging current Ibat is switched to the next intermediate value Im2 (=900 mA). The control circuit 320 repeatedly performs such an operation so as to change the charging current Ibat to the final value Iend.

When the charging current Ibat is to be reduced, such an arrangement is also capable of stabilizing communication between the power transmitter 200 and the power receiver 300.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Description has been made in the embodiment regarding an arrangement in which a gradual change in the charging current Ibat is ensured in both directions, i.e., when it is increased and when it is reduced. However, the present invention is not restricted to such an arrangement. For example, an arrangement may be made in which a gradual change in the charging current Ibat is ensured only when it is increased, and the charging current Ibat is not prevented from having a sharp change when it is reduced.

[Second Modification]

Description has been made in the embodiment regarding a wireless power transmitter that conforms to the Qi standard. However, the present invention is not restricted to such an arrangement. Also, the present invention is applicable to a wireless power transmitter employed in a system that is similar to the Qi standard and a power transmitter 200 that conforms to a standard which will be developed in the future.

While the preferred embodiments of the present invention have been described using specific terms, such description is for illustrative purposes only, and it is to be understood that changes and variations may be made without departing from the spirit or scope of the appended claims.

What is claimed is:

1. A control circuit employed in a wireless power receiver, wherein the wireless power receiver comprises:
    a reception coil;
    a rectifier circuit that is coupled to the reception coil and that generates a rectified voltage;
    a charger circuit that receives the rectified voltage, and that charges a battery; and
    a modulator that is coupled to the reception coil, and that modulates a voltage or otherwise a current applied to the reception coil according to a control value so as to transmit a control packet including the control value to a wireless power transmitter,
    wherein the control circuit comprises:
        a charging control unit that controls a charging current supplied from the charger circuit to the battery; and
        a power control unit that generates a control error value which indicates an electric power to be transmitted from the wireless power transmitter based on the difference between the present rectified voltage and a target value thereof, and that outputs the control error value thus generated as the control value to the modulator,
    and wherein, when the absolute value of the difference is smaller than a predetermined threshold value, the charging control unit changes the charging current.

2. The control circuit according to claim 1, wherein, when the charging current is to be changed from an initial value to a final value, the charging control unit changes the charging current in a stepwise manner from the initial value to the final value via multiple intermediate values set between the initial value and the final value,
    and wherein the charging control unit maintains the charging current until the absolute value of the difference becomes smaller than the threshold value every time the charging current is changed by one step, following which the charging control unit changes the charging current to a value that corresponds to a next step.

3. The control circuit according to claim 2, wherein an interval for the plurality of intermediate values is equal to a minimum step of the charging current adjustment that can be set for the charger circuit.

4. The control circuit according to claim 1, that conforms to the Qi standard.

5. The control circuit according to claim 1, monolithically integrated on a single semiconductor substrate.

6. A wireless power receiver comprising:
    a reception coil;
    a rectifier circuit that is coupled to the reception coil, and that generates a rectified voltage;
    a charger circuit that receives the rectified voltage, and that charges a battery;
    a modulator that is coupled to the reception coil, that modulates a voltage or otherwise a current applied to the reception coil according to a control value, and that transmits a control packet including the control value to a wireless power transmitter; and
    the control circuit according to claim 1.

7. A wireless power receiver comprising:
    a reception coil;
    a rectifier circuit that is coupled to the reception coil, and that generates a rectified voltage;
    a charger circuit that receives the rectified voltage, and that charges a battery;
    a modulator that is coupled to the reception coil, that modulates a voltage or otherwise a current applied to the reception coil according to a control value, and that transmits a control packet including the control value to a wireless power transmitter;
    a charging control unit that controls a charging current supplied from the charger circuit to the battery; and
    a power control unit that generates a control error value which indicates a rate of electric power transmission to be supplied from the wireless power transmitter, based on a difference between the present rectified voltage and a target value thereof, and that outputs the control error value thus generated as the control value to the modulator,
    wherein the charging control unit changes the charging current such that an absolute value of the difference does not exceed a predetermined allowable value.

8. The wireless power receiver according to claim 7, wherein, when the charging current is to be changed from an initial value to a final value, the charging control unit repeatedly performs:
    changing the charging current by a predetermined step; and
    maintaining the charging current until the absolute value of the difference becomes smaller than the predetermined threshold value.

9. The wireless power receiver according to claim 8, wherein the aforementioned step is equal to a minimum step of the charging current adjustment that can be set for the charger circuit.

10. The wireless power receiver according to claim 7, that conforms to the Qi standard.

11. A control method for a wireless power receiver, wherein the wireless power receiver comprises:
    a reception coil;
    a rectifier circuit that is coupled to the reception coil, and that generates a rectified voltage;
    a charger circuit that receives the rectified voltage, and that charges a battery; and
    a modulator that is coupled to the reception coil, that modulates a voltage or otherwise a current applied to the reception coil, and that transmits a packet to a wireless power transmitter, wherein the control method comprises:

controlling a charging current supplied from the charger circuit to the battery;

generating a control error value which indicates a rate of electric power transmission to be supplied from the wireless power transmitter based on a difference between the present rectified voltage and a target value thereof; and controlling the modulator according to the control error value so as to transmit a control packet including the control error value to the wireless power transmitter via the reception coil, and wherein the charging current is changed when an absolute value of the difference is smaller than a predetermined threshold value.

12. A control method for a wireless power receiver, wherein the wireless power receiver comprises:

a reception coil;

a rectifier circuit that is coupled to the reception coil, and that generates a rectified voltage;

a charger circuit that receives the rectified voltage, and that charges a battery; and a modulator that is coupled to the reception coil, that modulates a voltage or otherwise a current applied to the reception coil, and that transmits a packet to a wireless power transmitter, wherein the control method comprises:

generating a control error value which indicates a rate of electric power transmission to be supplied from the wireless power transmitter based on a difference between the present rectified voltage and a target value thereof;

controlling the modulator according to the control error value so as to transmit a control packet including the control error value to the wireless power transmitter; and controlling a charging current supplied from the charger circuit to the battery such that the difference does not exceed a predetermined allowable value.

13. The control method according to claim 11, wherein, in the controlling the charging current, when the charging current is to be changed from an initial value to a final value, changing the charging current by a predetermined step, and maintaining the charging current until the absolute value of the difference becomes smaller than the threshold value, are repeatedly performed.

14. The control method according to claim 13, wherein the aforementioned step is equal to a minimum step of the charging current adjustment that can be set for the charger circuit.

\* \* \* \* \*